(12) United States Patent
Harris et al.

(10) Patent No.: US 8,744,411 B2
(45) Date of Patent: Jun. 3, 2014

(54) INFORMING MOBILE STATIONS OF AN IMPORTANT MESSAGE

(75) Inventors: John M. Harris, Glenview, IL (US); Peter Lin, Lisle, IL (US)

(73) Assignee: Motorola Mobility LLC, Chicago, IL (US)

( * ) Notice: Subject to any disclaimer, the term of this patent is extended or adjusted under 35 U.S.C. 154(b) by 998 days.

(21) Appl. No.: 12/205,984

(22) Filed: Sep. 8, 2008

(65) Prior Publication Data
US 2010/0062747 A1 Mar. 11, 2010

(51) Int. Cl.
H04L 12/58 (2006.01)

(52) U.S. Cl.
USPC ............. 455/412.1; 455/435.1; 455/456.1; 370/331

(58) Field of Classification Search
USPC ............. 455/435.1, 412.2, 404.1, 404.2, 421, 455/436, 466, 67.14, 450, 434, 517; 370/311, 335, 331, 337, 280; 340/7.21, 340/991
See application file for complete search history.

(56) References Cited

U.S. PATENT DOCUMENTS

| | | | | |
|---|---|---|---|---|
| 5,483,669 A * | 1/1996 | Barnett et al. | ................ | 455/437 |
| 5,666,651 A * | 9/1997 | Wang | ............................. | 455/512 |
| 5,732,387 A * | 3/1998 | Armbruster et al. | ......... | 455/13.2 |
| 6,711,413 B1 * | 3/2004 | Heidari | .......................... | 455/515 |
| 7,817,982 B1 * | 10/2010 | Chu et al. | .................... | 455/404.1 |
| 2004/0110506 A1 * | 6/2004 | Dent | ............................... | 455/437 |
| 2005/0239436 A1 * | 10/2005 | Bell et al. | .................... | 455/404.2 |
| 2005/0239461 A1 * | 10/2005 | Verma et al. | ................ | 455/435.1 |
| 2007/0142050 A1 * | 6/2007 | Handforth et al. | ............ | 455/436 |
| 2007/0298797 A1 * | 12/2007 | Jiao et al. | .................... | 455/435.1 |
| 2008/0162637 A1 * | 7/2008 | Adamczyk et al. | ........... | 709/204 |
| 2009/0309742 A1 * | 12/2009 | Alexander et al. | ............ | 340/601 |
| 2009/0311963 A1 * | 12/2009 | Haverty | ....................... | 455/63.1 |

OTHER PUBLICATIONS

Mobility Management, Wikipedia, 4 pages.*
Sumit Kasera, 3G Networks, http://books.google.com, 1 page.*
Immediate, http://dictionary.cambridge.org, 1 page.*

* cited by examiner

Primary Examiner — Mahendra Patel

(57) ABSTRACT

A method for informing mobile stations in a geographic area of an important message is provided. The method includes identifying a geographic area, or zone, comprising at least one base station associated with a cell. A standard registration message associated with each cell in the zone is modified, which modifying results in a modified registration message with a command that is directed towards instructing mobile stations (MSs) that are already registered in the zone to re-register with the zone. The modified registration message then is broadcast from the base station. In response to the transmitting of the modified registration message, the method performs a processing of registration request messages sent from each of the MSs to the base station. In response to the processing, an acknowledge registration message is transmitted to each of the MSs, which acknowledge registration message includes data informing each of the MSs of the important message.

17 Claims, 7 Drawing Sheets

US 8,744,411 B2

INFORMING MOBILE STATIONS OF AN IMPORTANT MESSAGE

FIELD OF THE INVENTION

The present invention relates generally to informing mobile stations of an important message. The invention is specifically useful for, but not necessarily limited to, informing mobile stations of an important alert message associated with a geographical area.

BACKGROUND OF THE INVENTION

When a mobile station often referred to as user equipment is activated by a user, the mobile station typically registers with a wireless communication system. Registration is a process by which the mobile station notifies the wireless communication system of, among other things, a location, status, and identification of the mobile station. As part of the registration process, a mobile station operating in a slotted mode further provides a slot cycle parameter, so that the wireless communication system can determine which paging channel or forward common control channel slots are being monitored by the mobile station, and a protocol revision number, so that the wireless communication system knows the capabilities of the mobile station.

When a wireless communication system requires to inform mobile stations in one or more zones of an important message (such as an emergency alert) a dedicated emergency channel could be used to broadcast the important message the mobile stations. However, this would require that the mobile stations to keep monitoring the dedicated emergency channel and therefore battery drain could be an issue. Another approach could be for the system to sequentially call each of the mobile stations, however, this approach is inefficient and slow may not be appropriate if the important message has to be received expediently by all the mobile stations.

BRIEF DESCRIPTION OF THE DRAWINGS

In order that the invention may be readily understood and put into practical effect, reference now will be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
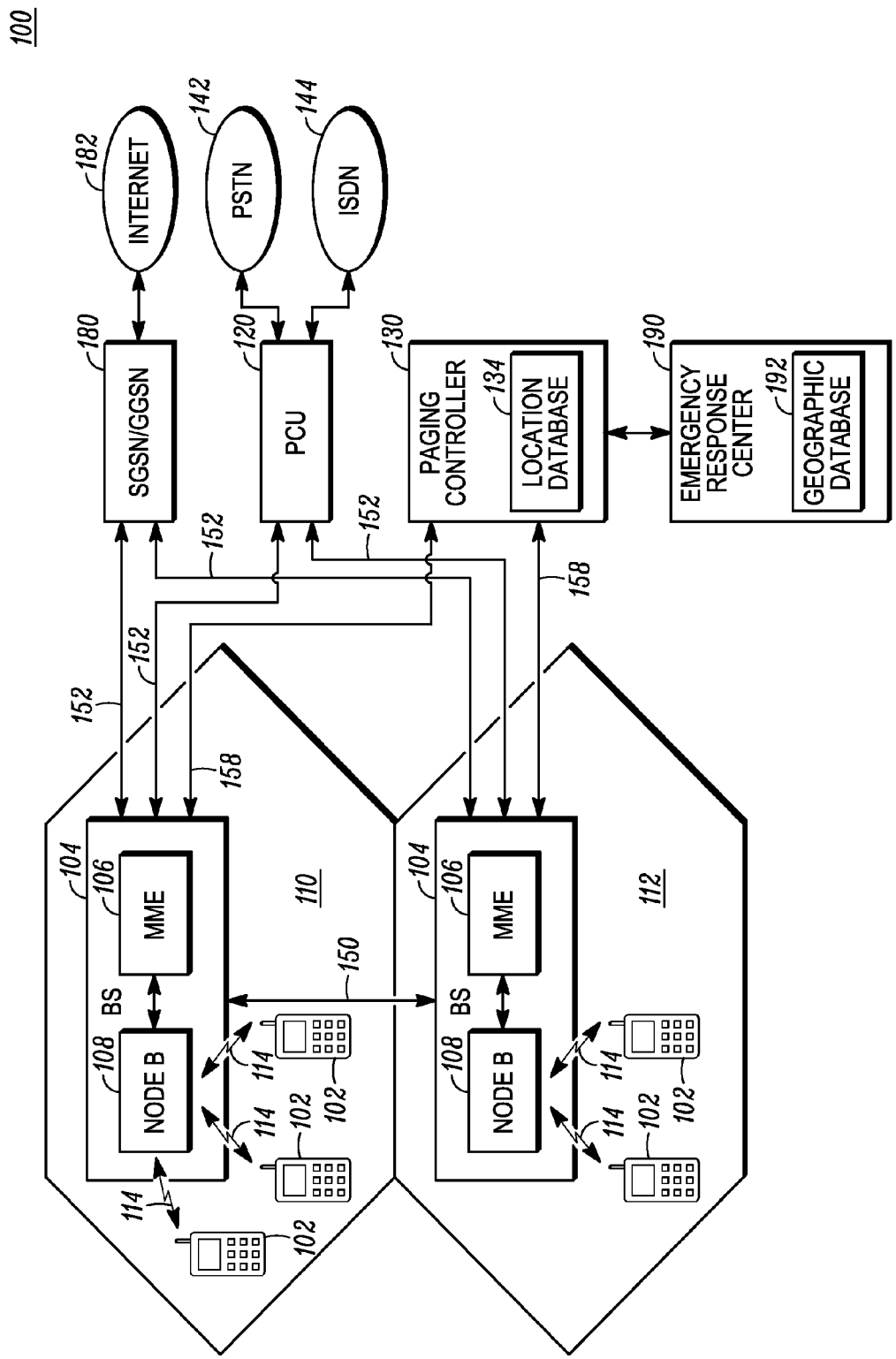
FIG. 1 is a simplified diagram illustrating a wireless communication system in communication with a plurality of mobile stations in accordance with an embodiment of the present.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in circuit components and method steps. Accordingly, the circuit components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that circuit components and method steps that comprises a list of elements does not include only those circuit components and method steps. An element proceeded by "comprises . . . a" does not, without more constraints, preclude elements but may include other elements not expressly listed or inherent to such a circuit components the existence of additional identical elements in the circuit components that comprises the element.

According to one embodiment of the invention there is provided a method for informing mobile stations in a geographic area of an important message, the method includes identifying a zone comprising at least one base station associated with a cell. The zone corresponds to the geographic area and the method performs modifying a standard registration message associated with each cell in the zone. The modifying results in a modified registration message with a command that is directed towards instructing mobile stations that are already registered in the zone to re-register with the zone. Next, broadcasting is performed resulting the modified registration message being broadcast from the base station, Then, the method performs processing a registration request message, sent from each of the mobile stations to the base station, in response to the transmitting of the modified registration message. Finally, the method performs transmitting to each of the mobile stations an acknowledge registration message in response to the processing. This acknowledge registration message includes data informing each of the mobile stations of the important message.

According to another embodiment of the invention there is provided a method for informing a mobile station of an important message, the method comprising processing, by the mobile station, a modified registration message transmitted from a base station, the modified registration message being different from an immediately preceding registration message received by the mobile station. The method the performs transmitting, to the base station, a registration request message, the transmitting being in response to the processing of the modified registration message. Next the method performs processing data received in an acknowledge registration message transmitted from the base station, wherein the data informs the mobile station of the important message.

Referring to FIG. 1, there is illustrated a simplified diagram of a communication system 100 in communication with a plurality of UEs in the form of mobile stations 102. The communication system 100 includes Base Stations (BS) 104 and although only two such base stations are shown it will be apparent to a skilled addressee that there would typically be many more such Base Stations. Each Base Station 104 includes at least one Base Transceiver Station (BTS) or Node B 108 coupled to a Base Station Controller (BSC) or Mobility Management Entity (MME) 106. Each Base Station 104 provides communications services via a two way multi channel radio link 114 to the mobile stations 102 located in an associated coverage area known as zone or cell 110,112. Typically, each radio link 114 includes a paging channel (PC), a forward common signaling channel (FCSC), a forward traffic channel (FTC), a reverse common signaling channel (RCSC) and a reverse traffic channel (RTC). Each cell 110,112 as illustrated is hexagonal, however, it will be recognized by those skilled in the art that other each cell 110,112 may have any shape such as circular, rectangular, triangular, irregular shaped or otherwise.

The communication system 100 further includes a paging controller 130 coupled to the Base Stations 104. The base stations 104 are coupled to at least one telecommunications core network through control nodes. There are different control nodes depending on the whether the communications connection is circuit-switched or packet switched. A Packet Control Unit (PCU) 120 control node connects the base stations 104 to circuit-switched networks such as a public switched telephone network (PSTN) 142 or an integrated services digital network (ISDN) 144. A serving GPRS support node (SGSN) 144 control node (that can also be a Gateway GPRS Support Node (GGSN)) connects the base stations 104 to packet switched networks such as the internet 182. As will be apparent to a skilled addressee, the communication system 100 could include multiple Packet Control Units (PCUs) 120 and serving GPRS support nodes (SGSNs) 144 assigned to a specific Base Station 104.

The paging controller 130 typically includes a location database 134 that stores a location of each of the mobile stations 102 serviced by the paging controller 130. Coupled to communicate with the paging controller 130 is an emergency response centre 190 that includes a processor (not shown) and a geographic database 192. The geographic database 192 is essentially a Geographic Information System (GIS) database that is capable of mapping geographical co-ordinates or geographical areas with cells 110,112 or zones of the communication system 100. In this regard, a zone comprises one or more adjacent or proximal cells 110,112 that provide communication coverage for the communication system over an identified geographic region or area.

The Base Stations 104 are operatively coupled to communicate with each other via a two way link 150 and the Base Stations 104 communicate with the Packet Control Unit (PCU) 120 and serving GPRS support node (SGSN) 144 by a coupling provided by respective two way links 152. Furthermore, the Base Stations 104 communicate with the paging controller 130 by respective two way links 158. Each Mobility Management Entity (MME), Node B 108, Packet Control Unit 120, paging controller 130 and serving GPRS support node (SGSN) 180 includes a processor such as a microprocessor or digital signal processor (DSP). This processor has and an associated memory that stores software, such as programs, applications, and operating protocols, that are executed by the processor and permits the functioning and operation of the Mobility Management Entity (MME) 106, Node B 108, Packet Control Unit (PCU) 120, paging controller 130 and serving GPRS support node (SGSN) 180.

Typically, communication system 100 operates in accordance with the 3GPP2 and TIA/EIA (Telecommunications Industry Association/Electronic Industries Association) A.S0001/IS-2001, or IOS (Inter Operability Specification), standard, which provides a compatibility standard for cdma2000, that is, including IS-2000 or 1xEV-DO air interfaces. The standard specifies wireless telecommunications system operating protocols, including radio system parameters and call processing procedures. However, those who are of ordinary skill in the art realize that communication system 100 may operate in accordance with any one of a variety of wireless packet data communication systems, such as, but not limited to, a Global System for Mobile communication (GSM) communication system, a Time Division Multiple Access (TDMA) communication system, a WiMax™ communication system, a Frequency Division Multiple Access (FDMA) communication system, or an Orthogonal Frequency Division Multiple Access (OFDM) communication system.

As will be apparent to those skilled in the art, when a user of activates one of the mobile stations 102, the mobile station 102 initiates an autonomous registration procedure by which the mobile stations 102 registers with the communications system 100 in accordance with well-known registration techniques. As part of the autonomous registration procedure, a location of the mobile station 102 is determined and stored in location database 134. The communications system 100 then assigns one of the multiple base stations 104 to provide communication services to mobile station 102 based its location. However, in certain situations, it is desirable for communication system 100 to initiate, or order, a registration of the mobile station 102. For example, a communications system 100 initiated registration may be desirable prior to intersystem short message service (SMS) delivery to allow for efficient delivery of voice or SMS to the communications system 100.

Figure 2:
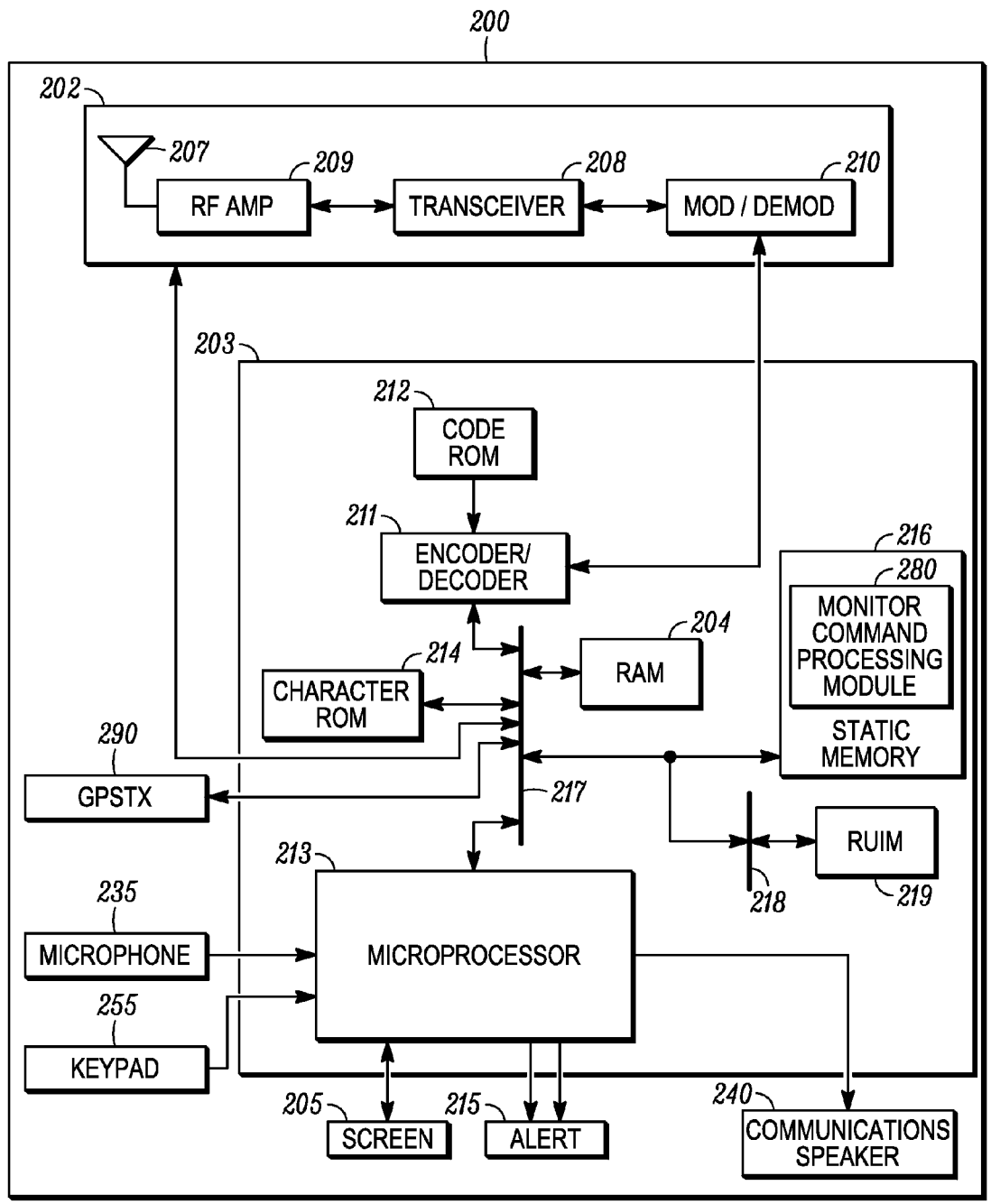
FIG. 2 is a schematic diagram of an exemplary embodiment of a mobile wireless communications device that is typically one of the mobile stations of FIG. 1.

Referring to FIG. 2, there is illustrated a schematic diagram of a mobile wireless communications device 200 (radio telephone), that is typically one of the mobile stations 102. The mobile wireless communications device 200 includes a radio frequency communications unit 202 coupled to be in communication with a processor 203. The mobile wireless communications device 200 also includes a display screen 205. There is also an alert module 215 that typically contains an alert speaker, vibrator motor and associated drivers. The display screen 205, and alert module 215 are coupled to be in communication with the processor 203.

The processor 203 includes an encoder/decoder 211 with an associated code Read Only Memory (ROM) 212 for storing data for encoding and decoding voice or other signals that may be transmitted or received by the mobile wireless communications device 200. The processor 203 also includes a micro-processor 213 coupled, by a common data and address bus 217, to the encoder/decoder 211, the radio frequency communications unit 202, a character Read Only Memory (ROM) 214, a Random Access Memory (RAM) 204, static programmable memory 216, a Removable User Identity Module (RUIM) interface 218 and a Global Positioning System (GPS) Transceiver 290. The static programmable memory 216 and a RUIM card 219 (commonly referred to as a Subscriber Identity Module (SIM) card that is operatively coupled to the RUIM interface 218) each can store, amongst other things, Preferred Roaming Lists (PRLs), subscriber authentication data, selected incoming text messages and a Telephone Number Database (TND phonebook) comprising a number field for telephone numbers and a name field for identifiers associated with one of the numbers in the name field. The RUIM card 219 and static programmable memory 216 may also store passwords for allowing accessibility to password-protected functions.

The micro-processor 213 has ports for coupling to the display screen 205, and the alert module 215. Also, micro-processor 213 has ports for coupling to a microphone 235, a communications speaker 240, and keypad 255. The character Read Only Memory 214 stores code for decoding or encoding text messages that may be received by the radio frequency communications unit 202. In this embodiment the static programmable memory 116 may also store Operating Code (OC) for the micro-processor 213 and code in a monitor command processing module 280 for use in performing the method 700 described below.

Typically the radio frequency communications unit 202 is a combined receiver and transmitter having an antenna 207. The radio frequency communications unit 202 has a transceiver 208 coupled to the antenna 207 via a radio frequency amplifier 209. The transceiver 208 is also coupled to a combined modulator/demodulator 210 that couples the radio frequency communications unit 202 to the processor 203.

Figure 3:
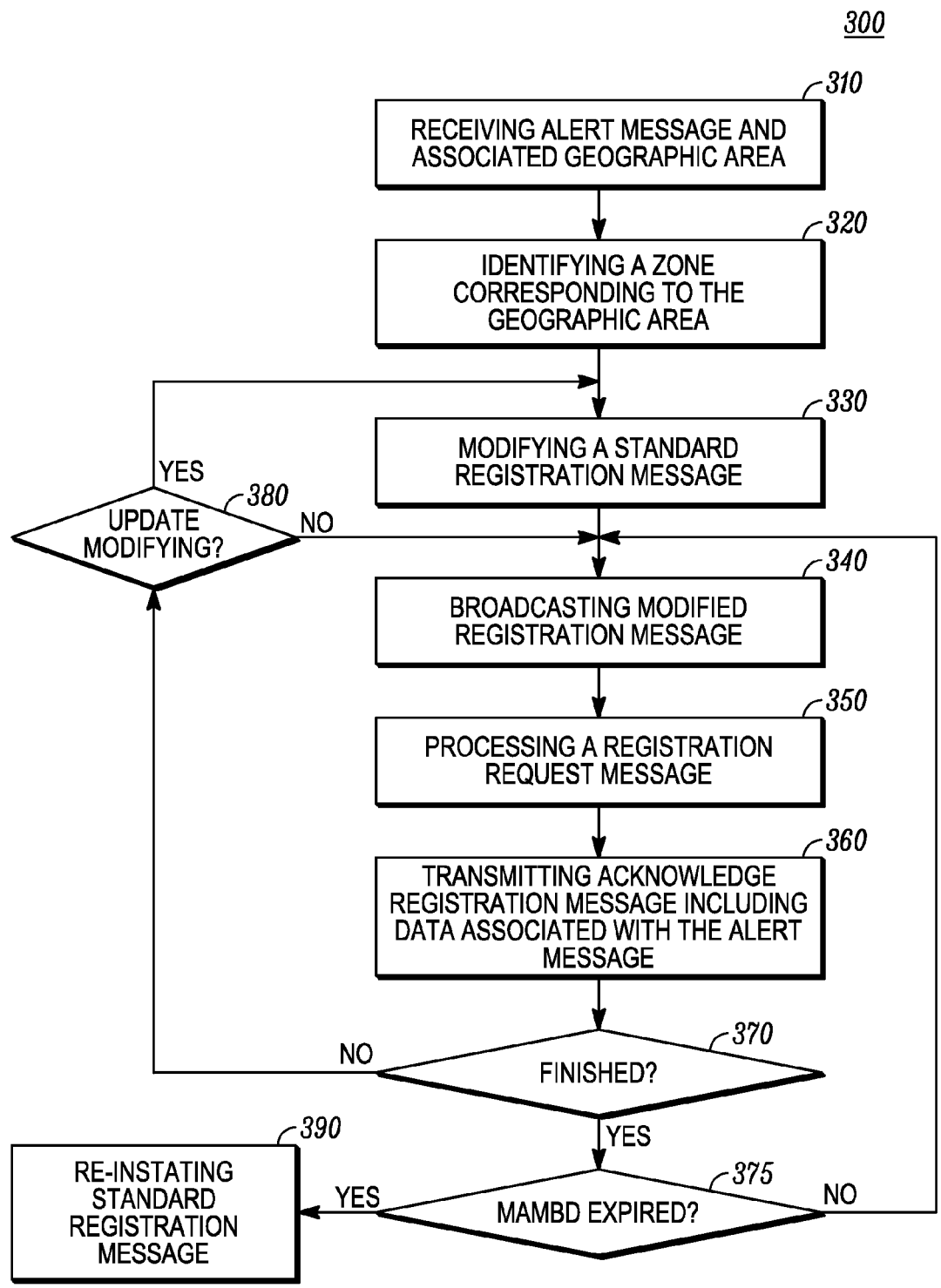
FIG. 3 is a flow diagram illustrating an exemplary embodiment of a method for informing mobile stations in a geographic area of an important alert message, the method being performed by the communications system of FIG. 1.

Referring to FIG. 3, there is illustrated a method 300 for informing mobile stations 102 in a geographic area of an important message. The method 300 is performed by the communications system 100 and is invoked by the emergency response center 190 receiving an important message and its associated geographic area, at a block 310, such as emergency alert message from a caller or otherwise. The associated geographic area identifies the location, area or region that is relevant to the message. For instance, the important message may be an important alert message such as a fire or a disaster alert message for a specific geographic region. Once the alert message and its associated geographical area have been received, the geographic database 192, at a block 320, performs identifying a zone comprising at least one base station 104 associated with a cell. For example, cell 110 or cell 112 or both cells 110 and 112 could form a zone or part of a zone, wherein the zone corresponds to the geographic area mapped by the geographic database 192 such that the zone covers the geographic area relevant to the important alert message. As will be apparent to those skilled in the art, the geographic area may be, for instance, a single street, a building (high-rise block), an industrial park, a housing suburb, a town, a county, state or otherwise.

The identifying at block 320 includes the paging controller 130 receiving the zone identifier information identifying the zone from the emergency response center 190. The zone identifier information includes cell identifiers and an identifier locating the barycentre or geographic centre of the zone. In its simplest form, the zone identifier information has a typical format of: {zone_alert_message_identifier, cell list, barycentre co-ordinates, Minimum Alert Message Broadcast Duration (MAMBD)}. The zone_alert_message_identifier is a numerical or alphanumerical identifier for the important alert message that distinguishes the zone alert message from all other possible alert messages in the communication system 100. In addition, the cell list is a list of all the cells that comprise the zone, the barycentre co-ordinates are the geographical co-ordinates of the geographic centre of the zone, and the Minimum Alert Message Broadcast Duration (MAMBD) is the minimum time that the alert message should be broadcast by the communication system 100.

Next, at a block 330, the paging controller 130 performs modifying a standard registration message associated with each cell in the zone. As will be apparent to a person skilled in the art, the standard registration message may typically be based on any registration message protocol such as a System Information Block (SIB) that is part of a System Information Protocol (SIP) message that is sequentially and synchronously broadcast on the paging channel (PC) of the radio links 114. The modifying at block 330 results in a modified registration message with a command that is directed towards instructing mobile stations 102 that are already registered in the zone to re-register with the zone. However, it will be apparent to a person skilled in the art that the command in the modified registration message is also directed towards instructing unregistered mobile stations 102 that are in a cell in the zone to register with the cell in the zone. Generally, the command to re-register (or register) includes modifying at least one parameter or one or more cell identifiers in the standard registration message. The paging controller 130 then, at a block 340, instructs selected base stations 104 to perform broadcasting the modified registration message. Thus, the broadcasting is from each one of the selected base stations 104 that are in the zone comprising the cell list.

At a block 350, the paging controller 130 performs processing a registration request message that was sent from each of the mobile stations 102 to the respective one of the base stations 104, the registration request message being received by respective ones of the base stations 104 in the zone in response to the transmitting of the modified registration message. Next, the paging controller 130 instructs the selected base stations 104, at a block 360, to perform transmitting to each of the mobile stations 102 in the zone, that sent the registration request message, an acknowledge registration message in response to the processing, wherein the acknowledge registration message includes data informing each of the mobile stations 102 of the important message. The data, broadcast on radio links 114, informing each of the mobile stations 102 of the important message typically includes a monitor command to listen to a channel, where the important message is broadcast. It is envisaged that the monitor command includes timing information for listening to the channel where the important message is broadcast. This timing information therefore instructs the mobile stations 102 that receive the monitor command to listen to the channel, where the important message is broadcast, at one or more pre-determined times.

At a test block 370, the paging controller 130 determines if the method 300 can terminate based on a number of criterion or tests that form one or more embodiments of the present invention. These tests are: 1) cell list based; (2) minimum base station distance threshold value based; and (3) period re-registration timer threshold value based.

Figure 4:
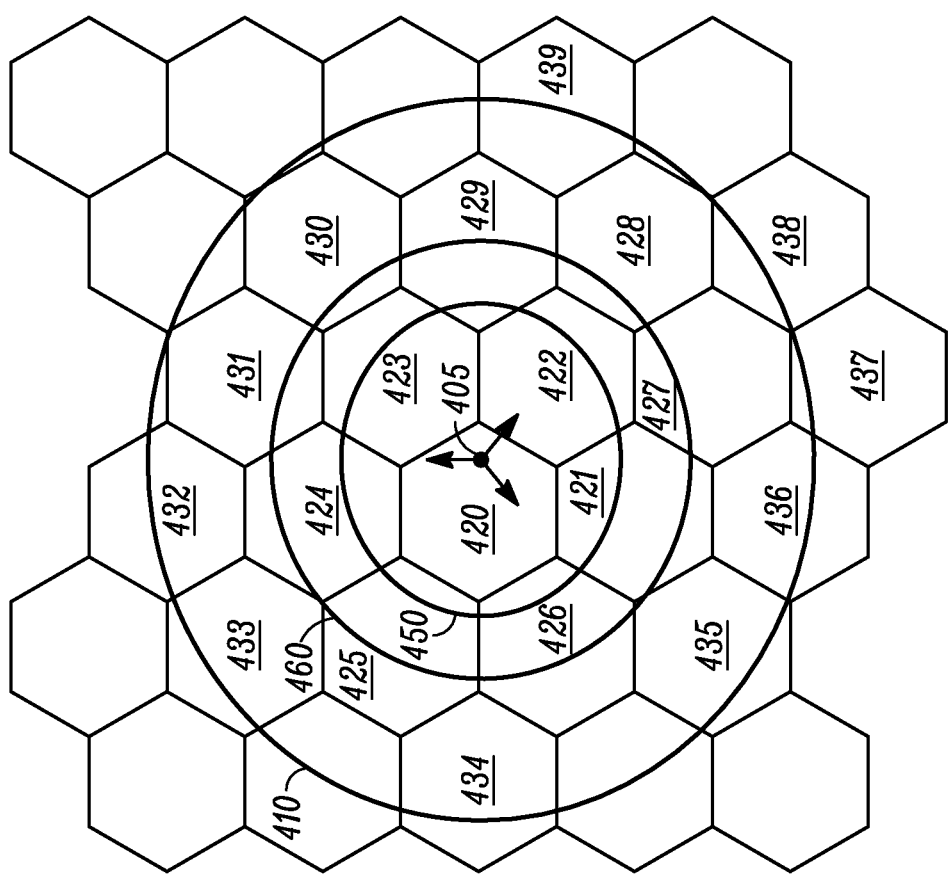
FIG. 4 illustrates an exemplary zone identifying a geographic area associated with the important alert message.

Considering the embodiment of the (1) cell list based test performed at test block 370. This test essentially determines if all cells in the cell list of the zone identifier information: {zone_alert_message_identifier, cell list, barycentre co-ordinates, Minimum Alert Message Broadcast Duration (MAMBD)} have been broadcasting the modified registration message. For instance, referring to FIG. 4, there is illustrated an exemplary zone identifying a geographic area associated with the important alert message. In this example, the identified zone for the geographical area associated with the important alert message is within the area at least partially enclosed by circle 410. This zone will have a zone_alert_message_identifier (for example ZAMI100), the cell list will comprise the following list of cells: 420, 421, 422, 423,424, 425, 426, 427,428,429,430,430, 431,432,433,434, 435,436, 437,438,439 and the barycentre co-ordinates are geographic co-ordinates that identify the barycentre 405 of the zone.

Typically, the (1) cell list based test is performed at test block 370 when the modifying the standard registration message includes changing the cell identifiers and more specifically incrementally changing cell identifiers. These cell identifiers can be tracking cell or zone identifiers in the System Information Block (SIB) that is part of a System Information Protocol (SIP) message. This changing is characterized by prioritizing the changing of the cell identifiers for cells that are at the centre of the geographic area, in other words prioritizing cells nearest the barycentre 405. In this regard, barycentre has the broad meaning that simply indicates the centre of the geographic "hot spot" that may be affected by terrain or population distribution such that the barycentre 405 need not necessarily be a true geographic centre. Initially, only cells 420,421,422 and 423 that are at least partially enclosed by circle 450 will have their cell identifiers changed during the modifying at block 330. As a result, the base stations 104 for cells 420, 421, 422, 423 will broadcast a different or changed cell identifier than that in their respective standard registration message. Thus, any registered mobile station 102 located in cells 420, 421, 422, 423 will detect the changed cell identifier and thereby attempt to register with what it determines to be a newly identified base station or cell.

Since only cells 420, 421, 422, 423 have had their cell identifiers changed, test block 370 will determine that not all the cells in the cell list have broadcast the modified registration message. Accordingly, a test block 380 determines if the modifying of the standard registration message should be updated so that the modified registration message includes the cells bounded by circle 460. This test, at test block 380, is a generally a Time Based Test (TBT) in which for instance if the last modifying was more than three minutes earlier then the modifying should be updated otherwise block 340 will repeat the broadcasting of the last version of the modified registration message.

If at test block 380 it is determined that the modifying of the standard registration message should be performed then block 330 performs modifying the standard registration message to include cells 420,421,422,423,424,425,426,427,428, 429 that are at least partially enclosed by circle 460. In this regard, it should be noted that there is a threshold that at least 10% of cells area must be enclosed (within the zone or sub-zone) before it is considered to be one of the cells selected to broadcast the modified registration message. Once, block 330 performs modifying the standard registration message to include cells 420,421,422,423,424,425,426,427,428, 429 and blocks 340 to 380 are repeated. Thus, any registered mobile station 102 located in cells 420,421,422,423,424,425, 426,427,428, 429 will detect (or have previously detected) the changed cell identifier and thereby attempt to register with what it determines to be a newly identified base station or cell. Blocks 340 to 380 are repeated until test block 380 determines that the modifying of the standard registration message should be updated so that the modified registration message includes the cells bounded by circle 410.

When test block 380 determines, by the Time Based Test (TBT), that the modifying of the standard registration message should be updated, block 330 performs modifying the standard registration message to include cells 420, 421, 422, 423, 424, 425, 426, 427, 428, 429, 430, 431, 432, 433, 434, 435, 436, 437,438, 439 that are at least partially enclosed by circle 410 and blocks 340 to 370 are performed again. Thus, any registered mobile station 102 located in cells 420, 421, 422, 423, 424, 425, 426, 427, 428, 429, 430, 431, 432, 433, 434, 435,436, 437,438, 439 will detect (or have previously detected) the changed cell identifier and thereby attempt to register with what it determines to be a newly identified base station or cell. Test block 370 now determines that all cell in the cell list have broadcast the modified registration message and thus at a test block 375 it is determined if the Minimum Alert Message Broadcast Duration (MAMBD) has expired. If it is determined at test block 375 that the Minimum Alert Message Broadcast Duration (MAMBD) has not expired then blocks 340 to 375 are repeated until test block 375 determines the expiration of the Minimum Alert Message Broadcast Duration (MAMBD). The method 300 performs, at a block 390, re-instating the standard registration message. This re-instating is conducted in a similar fashion to blocks 430 to 480 until all cells in the cell list are broadcasting their standard registration message instead of the modified registration message.

It is envisaged that the geographic area can be any shape and the circles 410,450,460 are provided as a simple example. The size and shape of a geographic area may determine the number of such circles or other shapes. Thus, the cell list based test performed at test block 370 provides for changing the cell identifier by incrementally changing cell identifiers for cells in the zone and prioritizing the changing of the cell identifiers for cells that are at the centre of the geographic area (nearest to the barycentre 405). The incrementally changing of the cell identifiers balances the loading of the communication system in which mobile stations 102 nearest the barycentre 405 of an emergency will be the first to receive the important alert message.

Figure 5:
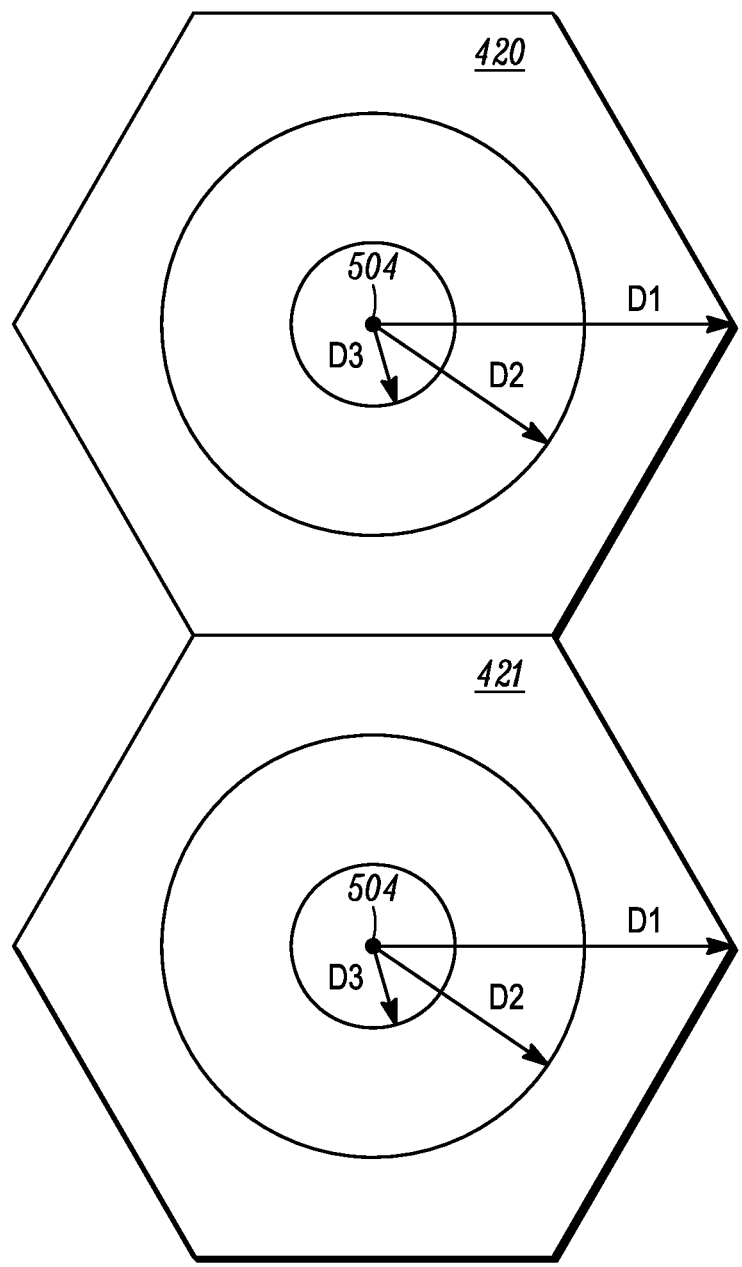
FIG. 5 illustrates two cells of the exemplary zone of FIG. 4.

Considering the embodiment of the (2) minimum base station distance threshold value based test performed at test block 370. This test essentially determines if all cells in the cell list of the zone identifier information: {zone_alert_message_identifier, cell list, barycentre co-ordinates, Minimum Alert Message Broadcast Duration (MAMBD)} have been broadcasting the modified registration message with a distance from base station value (DV) at or below a minimum base station distance threshold value. The distance from base station value (DV) can be included in the System Information Protocol (SIP) message as will be apparent to a person skilled in the art. For instance, referring to FIG. 5, there is illustrated two cells of the exemplary zone 400 identifying a geographic area associated with the important alert message. In this exemplary embodiment, the identified zone for the geographical area associated with the important alert message will again have a zone_alert_message_identifier (for example ZAMI100) and the cell list will comprise the following list of cells: 420, 421, 422, 423,424, 425, 426, 427, 428, 429, 430, 430, 431, 432, 433, 434, 435, 436, 437, 438, 439. The geographic centre of each one of the cells are represented by geographic co-ordinates, where the geographic centre of each one of the cells is the geographic location of the base station in the respective cell that is known by the communication system 100. However, the barycentre co-ordinates are optional for this minimum base station distance threshold value based test performed at test block 370 but may be used if prioritizing of cells is required.

Typically, the (2) minimum base station distance threshold value based test is performed at test block 370 when the modifying the standard registration message includes changing the distance from base station value (DV) that is indicative of a maximum distance a mobile station 102 can be from its currently registered base station 504 before it must attempt re-registration with a cell. As illustrated, the standard registration message for cells 420 and 421 each have a DV of D1 that is essentially the maximum distance the cells 420 and 421 extend from their base stations 504. All other cells in the cell list will also have a DV of D1 or otherwise. Thus, the modifying at block 330 will result in standard registration message having the DV (which could be a multiplier value) reduced from D1 to D2. As a result, the base stations 104 for cells in the cell list will broadcast a changed DV value of D2 and any registered mobile station 102 located between D1 and D2 will thereby attempt to register with what it determines to be a newly identified base station or cell.

The DV may be a distance value or distance value multiplier in which the each base station 104 broadcasts in the System Information Block (SIP) its geographical co-ordinates and the mobile stations 102 that have GPS transceivers can determine their distance from their respective base station 104 and re-register when they are outside the DV in the modified registration message. In one alternative, the DV may be a minimum required signal strength value that is indicative of a maximum distance a mobile station 102 can be from its currently registered base station 104 before it must attempt re-registration with a cell.

Test block 370 will determine that the DV is not at or below the minimum base station distance threshold value (typically indicative of a negligible distance of about 1 meter) and that modified registration message has not been broadcast for a Minimum Required Duration (MRD). Accordingly, a test block 380 determines if the modifying of the standard registration message should be updated so that DV is reduced to D3. This test at test block 380 is a generally a Time Based Test (TBT) in which for instance if the last modifying was more than three minutes earlier then the modifying should be updated otherwise block 340 will repeat the broadcasting of the last version of the modified registration message.

If at test block 380 it is determined that the modifying of the standard registration message should be performed then block 330 performs modifying the standard registration message so that the DV value is reduced from D2 to D3. Once, block 330 performs modifying the standard registration message, blocks 340 to 380 are repeated. As a result, the base stations 104 for cells in the cell list will broadcast a changed DV value of D3 and any registered mobile station 102 located between D1 and D3 will thereby attempt (or previously have attempted) to register with what it determines to be a newly identified base station or cell. Bocks 340 to 380 are then repeated until test block 380 determines that the modifying of the standard registration message should be updated so that the modified registration message is updated so that DV is essentially at its minimum value.

When test block 380 determines, by the Time Based Test (TBT), that the modifying of the standard registration message should be updated, block 330 performs modifying the standard registration message so that DV is essentially at its minimum value. Blocks 340 to 370 are then repeated resulting in the base stations 104 for cells in the cell list broadcasting a changed DV value that is the minimum value of around one meter and any registered mobile station 102 located between the base station 504 and D1 will thereby attempt (or previously have attempted) to register with what it determines to be a newly identified base station or cell. Test block 370 now determines that the DV is at or below the minimum base station distance threshold value and thus at a test block 375 it is determined if the Minimum Alert Message Broadcast Duration (MAMBD) has expired. If it is determined at test block 375 that the Minimum Alert Message Broadcast Duration (MAMBD) has not expired then blocks 340 to 375 are repeated until test block 375 determines the expiration of the Minimum Alert Message Broadcast Duration (MAMBD).

The method 300 performs, at a block 390, re-instating the standard registration message. This re-instating is conducted in a similar fashion to blocks 430 to 480 until all cells in the cell list are broadcasting their standard registration message instead of the modified registration message.

The incrementally changing of the DV balances the loading of the communication system 100 in which mobile stations 102 furthest from a base station 104 in a cell will be the first to receive the important alert message.

Considering the embodiment of the (3) period re-registration timer threshold value based test performed at test block 370. This test essentially determines if all cells in the cell list of the zone identifier information: {zone_alert_message-_identifier, cell list, barycentre co-ordinates, Minimum Required Duration (MRD)} have been broadcasting the registration message with the period re-registration timer value (PRTV) set to a minimum value For instance, referring to FIG. 6, there is illustrated a graph of the period re-registration timer value (PRTV) against alert duration (the time since the initial method was initiated). The (3) period re-registration timer threshold value based test is performed at test block 370 when the modifying the standard registration message includes changing the period re-registration timer value (PRTV) in the System Information Protocol (SIP) message.

Figure 6:
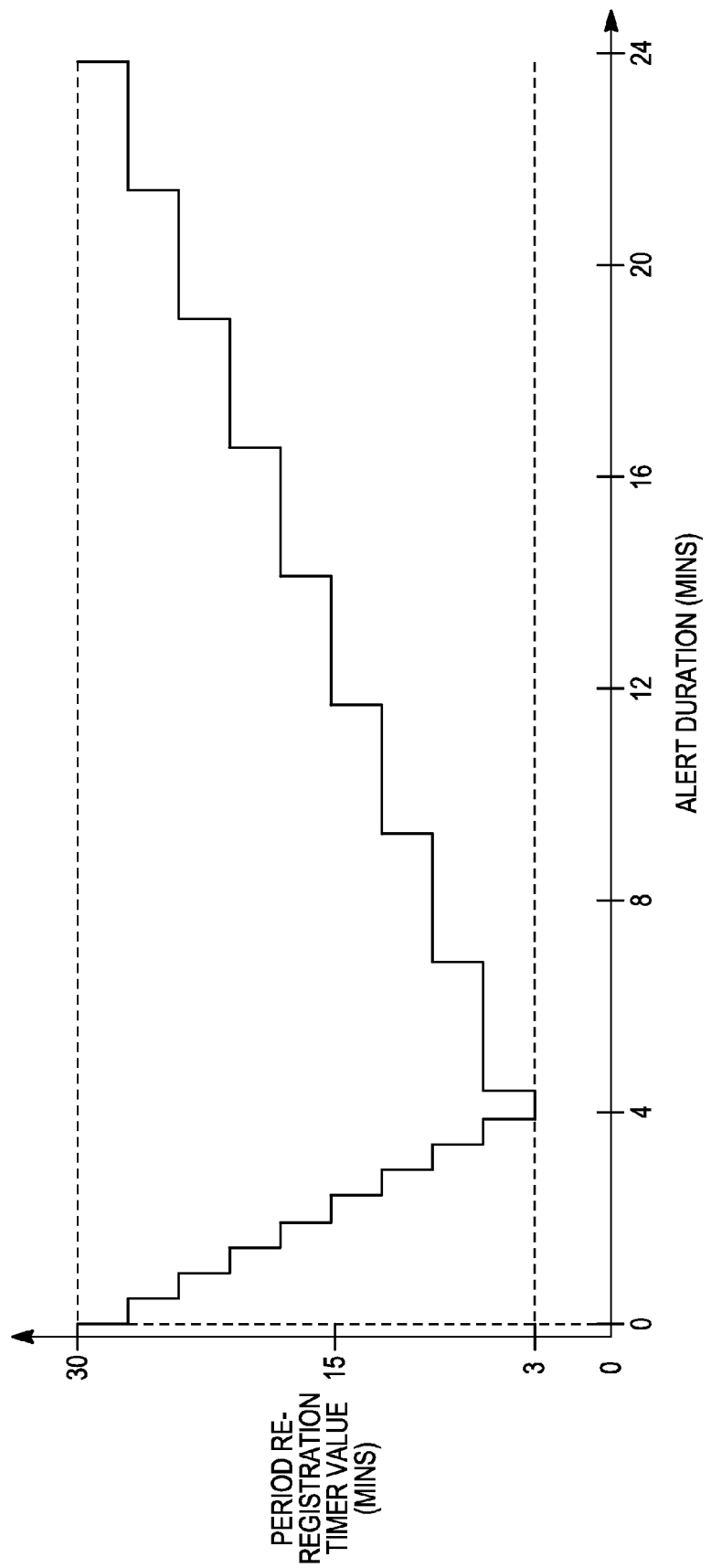
FIG. 6 illustrates a graph of a period re-registration timer value against alert duration.

In FIG. 6, the minimum re-registration timer threshold value (MRTTV) is set to 3 minutes (but other values are possible) and in the period re-registration timer value (PRTV) in the standard registration message is 30 minutes. Thus, when the method 300 first performs the modifying at block 330 the period re-registration timer value (PRTV) is changed from to 30 minutes to 27 minutes in each of the cells in the cell list. As a result, after the broadcasting of block 240 any mobile station 102 in the zone that has not re-registered for 27 minutes or more will transmit a registration request message that will be received by the communication system 100 at block 350. Test block 370 will determine that the period re-registration timer value (PRTV) is not at or below the minimum re-registration timer threshold value (MRTTV). Accordingly, a test block 380 determines if the modifying of the standard registration message should be updated so that period re-registration timer value (PRTV) is reduced for instance from 27 minutes to 24 minutes This test at test block 380 is a generally a Time Based Test (TBT) in which for instance if the last modifying was more than 30 seconds earlier then the modifying should be updated otherwise block 340 will repeat the broadcasting of the last version of the modified registration message.

If at test block 380 it is determined that the modifying of the standard registration message should be performed then block 330 performs modifying the standard registration message so that the period re-registration timer value (PRTV) is reduced to 21 minutes. Once, block 330 performs modifying the standard registration message, blocks 340 to 380 are repeated until the period re-registration timer value (PRTV) reaches the minimum re-registration timer threshold value (MRTTV). Once the period re-registration timer value (PRTV) reaches the minimum re-registration timer threshold value (MRTTV) the method 300 determines, at test block 375 if the Minimum Alert Message Broadcast Duration (MAMBD) has expired. If it is determined at test block 375 that the Minimum Alert Message Broadcast Duration (MAMBD) has not expired then blocks 340 to 375 are repeated until test block 375 determines the expiration of the Minimum Alert Message Broadcast Duration (MAMBD). The method 300 performs, at a block 390, re-instating the standard registration message in which the period re-registration timer value (PRTV) is incrementally increased back to its original value of 30 minutes. This re-instating is conducted in a similar fashion to blocks 430 to 480 until all cells in the cell list are broadcasting their standard registration message instead of the modified registration message.

The incrementally changing or reducing of the period re-registration timer value (PRTV) balances the loading of the communication system 100 and the duration between increments can be varied depending on historic load balancing data. Furthermore, as will be apparent to a person skilled in the art, any of the above methods (changing the cell identifiers, changing the distance from base station value (DV), changing the period re-registration timer) need not be conducted incrementally thus eliminating the need for test blocks 370 and 380.

Figure 7:
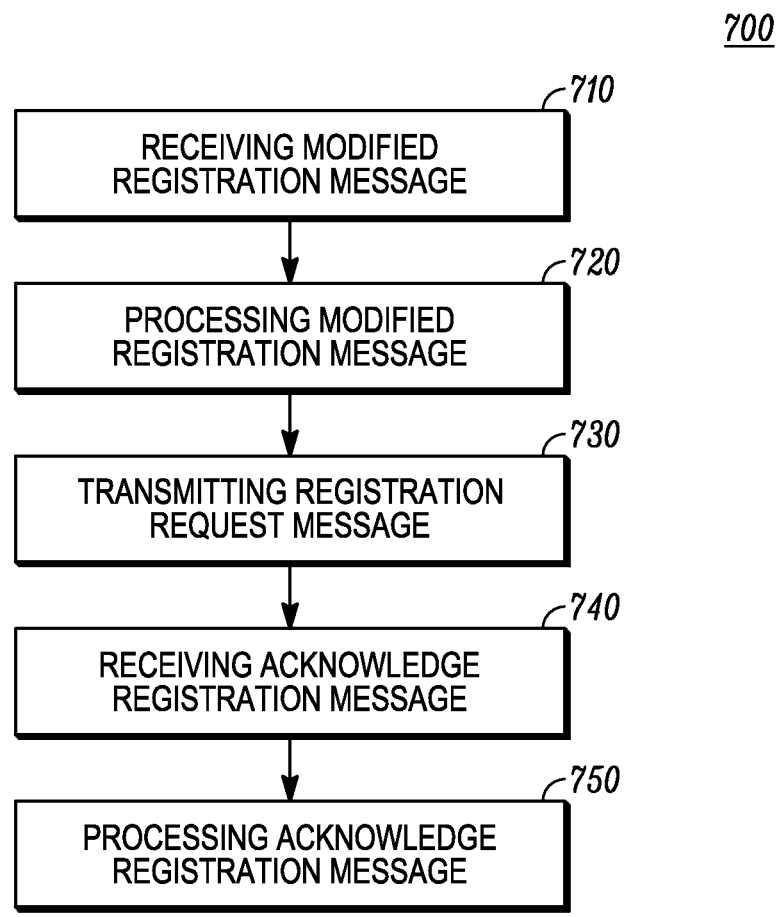
FIG. 7 is a flow diagram illustrating an exemplary embodiment method for informing a mobile station of an important message.

Referring to FIG. 7 there is illustrated a method 700 for informing a mobile station, such as the mobile wireless communications device 200, of an important message. At a block 710 the mobile wireless communications device 200 (mobile station) performs receiving a modified registration message transmitted from a base station as described in the method 300. At a block 720 the method 700 performs Processing, the mobile wireless communications device 200 (mobile station), a modified registration message transmitted from a base station. This modified registration message is different from an immediately preceding registration message received by the mobile wireless communications device 200 (mobile station) and is a modified version of the standard registration message describe above. The modified registration message can include a modified distance from base station value that is indicative of a maximum distance the mobile station can be from the base station before it must attempt re-registration with a cell.

The modified registration message could include a modified minimum required signal strength value that is indicative of a maximum distance the mobile station can be from base station before it must attempt re-registration with a cell. The mobile wireless communications device 200 (mobile station) can determine if it is outside this maximum distance by using co-ordinates obtained from the GPS transceiver 290 that are compared with the base station co-ordinates provided in the modified registration message. As another option the modified registration message can include a different cell identifier than that of the standard registration message. Another option could be that the modified registration message includes a reduced a period for re-registration timer value.

Next, at a block 730, the mobile wireless communications device 200 (mobile station) performs transmitting, to the base station, a registration request message, the transmitting being in response to the processing of the modified registration message. The mobile wireless communications device 200 (mobile station) then performs receiving an acknowledge registration message transmitted from the base station and a block 759 then performs processing data received in the acknowledge registration message. This data informs the mobile wireless communications device 200 (mobile station of the important message. The mobile wireless communications device 200 (mobile station) can then process the data which could for example be a monitor command to listen to a channel where the important message is broadcast. The data could further include timing information for listening to the channel where the important message is broadcast. In one alternative, the data informing the mobile station of the important message identifies a canned message stored in a memory, specifically the monitor command processing module, of the mobile wireless communications device 200 (mobile station). For instance, the data could be a one byte field that if set to 00000000 is coded to mean important message, if set to 00000001 is coded to mean "fire alert", if set to 00000002 is coded to mean "hurricane warning", if set to 00000003 is coded to mean "schools closed today" and so forth.

Advantageously, the present invention provides for informing mobile stations in one or more zones of an important message (such as an emergency alert) without the need of the mobile stations to keep monitoring the dedicated emergency channel or sequentially calling each of the mobile stations in the zone with the message.

It will be appreciated that the embodiment of the present invention described herein may be comprised of one or more conventional processors and unique stored program instructions that control the one or more processors to implement, in conjunction with certain non-processor circuits, some, most, or all of the functions the circuit as described herein. The non-processor circuits may include, but are not limited to, a radio receiver, a radio transmitter, signal drivers, clock circuits, power source circuits, and user input devices. As such, these functions may be interpreted as steps for the methods described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for informing mobile stations in a geographic area of an important message, the method comprising:
identifying a zone comprising a base station associated with a cell, the zone corresponding to the geographic area;
modifying a standard registration message associated with the cell, the modifying resulting in a modified registration message that is different from an immediately preceding registration message broadcast by the base station and comprising a command that is directed towards instructing mobile stations that are already registered in the cell to re-register with the cell, wherein modifying the standard registration message includes at least one of changing a distance from base station value that is indicative of a maximum distance a mobile station can be from its currently registered base station before it must attempt re-registration with the cell, changing a minimum required signal strength value that is indicative of a maximum distance a mobile station can be from its currently registered base station before it must attempt re-registration with the cell, and changing a cell identifier for the cell, and reducing a period for re-registration timer value;

broadcasting the modified registration message from the base station;

processing a registration request message, sent from each of the mobile stations to the base station, in response to the transmitting of the modified registration message from the base station; and transmitting to each of the mobile stations from the base station an acknowledge registration message in response to the processing, wherein the acknowledge registration message includes data informing each of the mobile stations of the important message.

2. A method for informing mobile stations in a geographic area of an important message, as claimed in claim 1, wherein the incrementally changing cell identifiers for cells in the zone is characterized by prioritizing the changing of the cell identifiers for cells that are at the center of the geographic area.

3. A method for informing mobile stations in a geographic area of an important message, as claimed in claim 1, wherein the period for re-registration timer value is incrementally reduced.

4. A method for informing mobile stations in a geographic area of an important message, as claimed in claim 1, wherein the standard registration message includes a system information block.

5. A method for informing mobile stations in a geographic area of an important message, as claimed in claim 1, wherein the data informing each of the mobile stations of the important message includes a monitor command to listen to a channel where the important message is broadcast.

6. A method for informing mobile stations in a geographic area of an important message, as claimed in claim 5, wherein the monitor command includes timing information for listening to the channel where the important message is broadcast.

7. A method for informing mobile stations in a geographic area of an important message, as claimed in claim 1, wherein the command in the modified registration message is also directed towards instructing unregistered mobile stations that are in the zone to register with the zone.

8. A method for informing a mobile station of an important message, the method comprising:

processing, by the mobile station, a modified registration message transmitted from a base station, the modified registration message being different from an immediately preceding registration message received by the mobile station from the base station, wherein the modified message includes at least one of a modified distance from base station value that is indicative of a maximum distance the mobile station can be from the base station before it must attempt re-registration with a cell, a modified minimum required signal strength value that is indicative of a maximum distance the mobile station can be from base station before it must attempt re-registration with a cell, and a different cell identifier than was included in the immediately preceding registration message, and a reduced period for re-registration timer value;

transmitting, to the base station, a registration request message, the transmitting being in response to the processing of the modified registration message transmitted from the base station; and processing data received in an acknowledge registration message transmitted from the base station, wherein the data informs the mobile station of the important message.

9. A method for informing a mobile station of an important message, as claimed in claim 8, wherein the data informing the mobile station of the important message includes a monitor command to listen to a channel where the important message is broadcast.

10. A method for informing a mobile station of an important message, as claimed in claim 8, wherein the monitor command includes timing information for listening to the channel where the important message is broadcast.

11. A method for informing a mobile station of an important message, as claimed in claim 8, wherein the data informing the mobile station of the important message identifies a canned message stored in a memory of the mobile station.

12. A base station that informs mobile stations served by the base station of an important message, the base station comprising:

a processor configured to receive a message identifying a zone comprising the base station, the zone corresponding to a geographic area, modify a standard registration message associated with the base station, the modifying resulting in a modified registration message that is different from an immediately preceding registration message broadcast by the base station and comprising a command that is directed towards instructing mobile stations that are already registered with the base station to re-register with the base station, wherein modifying the standard registration message includes at least one of changing a distance from base station value that is indicative of a maximum distance a mobile station can be from its currently registered base station before it must attempt re-registration with the cell, changing a minimum required signal strength value that is indicative of a maximum distance a mobile station can be from its currently registered base station before it must attempt re-registration with the cell, and changing a cell identifier for the cell, and reducing a period for re-registration timer value, broadcast the modified registration message, in response to the broadcasting the modified registration message, process a registration request message received from each of the mobile stations, and transmit to each of the mobile stations an acknowledge registration message in response to the processing, wherein the acknowledge registration message includes data informing each of the mobile stations of the important message.

13. A mobile station comprising:

a transceiver;

a processor configured to register with a base station, subsequent to registering with the base station, process a modified registration message received from the base station, the modified registration message being different from an immediately preceding registration message received by the mobile station from the base station, wherein the modified message includes at least one of a modified distance from base station value that is indicative of a maximum distance the mobile station can be from the base station before it must attempt re-registration with a cell, a modified minimum required signal strength value that is indicative of a maximum distance the mobile station can be from base station before it must attempt re-registration with a cell, and a different cell identifier than was included in the immediately preceding registration message, and a reduced period for re-registration timer value, transmit, to the base station via the transceiver, a registration request message, the transmitting being in response to the processing of the modified registration message received from the base station, and process data received in an acknowledge registration message transmitted from the base station and received via the transceiver, wherein the data informs the mobile station of the important message.

14. A method for informing mobile stations in a geographic area of an important message, as claimed in claim 1, wherein the important message is an emergency alert message.

15. A method for informing a mobile station of an important message, as claimed in claim 8, wherein the important message is an emergency alert message.

16. A base station that informs mobile stations served by the base station of an important message, as claimed in claim 12, wherein the important message is an emergency alert message.

17. A mobile station, as claimed in claim 13, wherein the important message is an emergency alert message.

\* \* \* \* \*